UNITED STATES PATENT OFFICE.

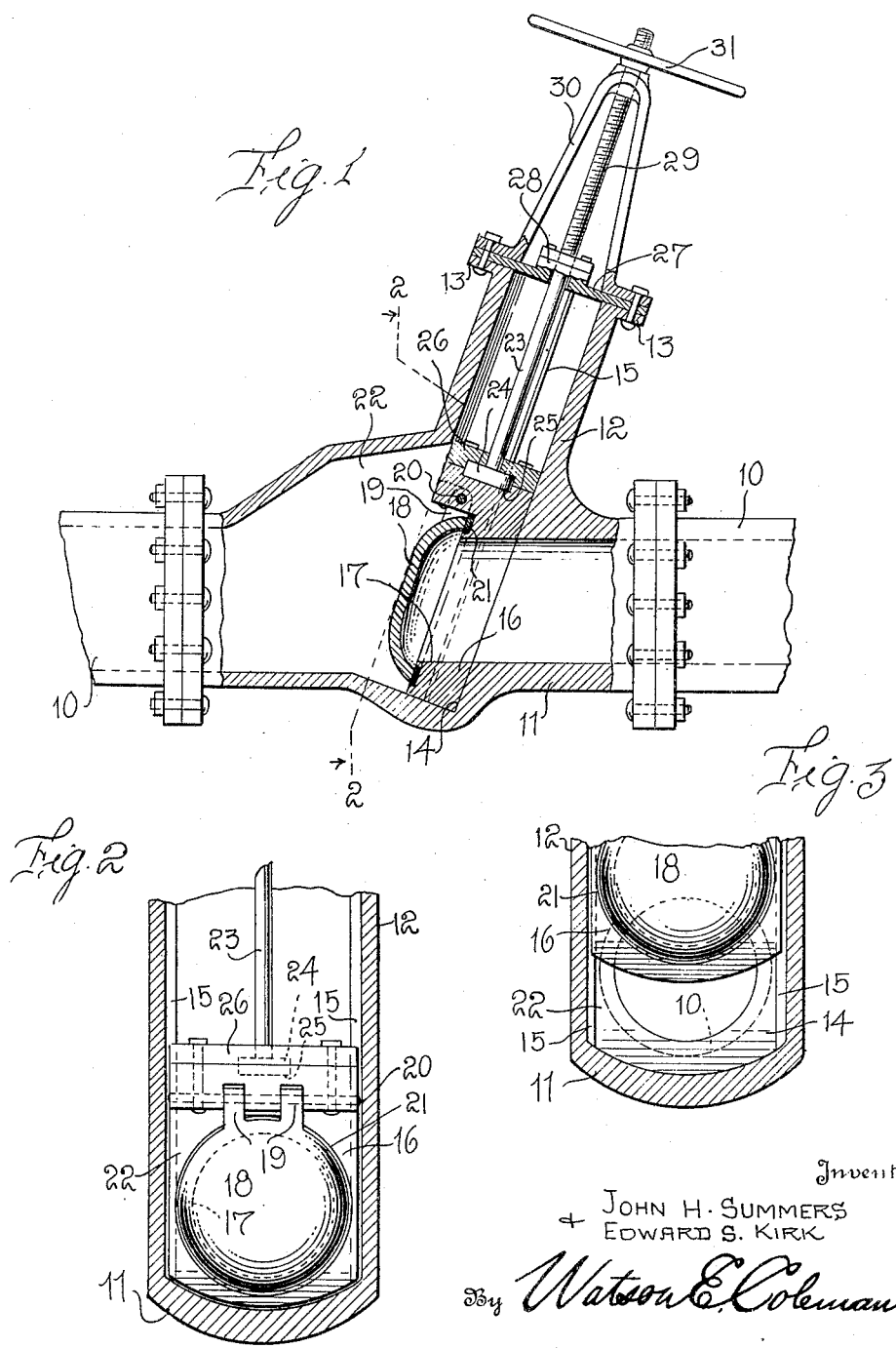

JOHN H. SUMMERS AND EDWARD S. KIRK, OF TAFT, CALIFORNIA.

VALVE.

1,379,136.  Specification of Letters Patent.  Patented May 24, 1921.

Substitute for application Serial No. 290,607, filed April 16, 1919. This application filed March 28, 1921. Serial No. 456,225.

*To all whom it may concern:*

Be it known that we, JOHN H. SUMMERS and EDWARD S. KIRK, citizens of the United States, residing at Taft, in the county of Kern and State of California, have invented certain new and useful Improvements in Valves, of which the following is a specification, reference being had to the accompanying drawings.

This invention relates to valves, and particularly to valves which are adapted to be used in high pressure oil lines, though the valve is also adapted to be used under many other circumstances.

The general object of this invention is to provide a valve including a valve body having a passage through it and slidingly arranged to move into position across a pipe line or out of such position, said valve body having a swinging check valve mounted thereon so that when the valve body is in the first named position, fluid may pass the swinging check valve, the check valve preventing its return, but that when it is desired to permit the return of fluid through the pipe, the check valve may be raised to thereby permit the return of the fluid.

A further object is to provide a construction of this kind so made that one man may readily operate it and do away with the necessity now present in this art of removing check valves in order to permit the return flow of fluid or in order to pump back the oil, which removal of the check valve costs an amount which, when multiplied by the number of check valves which have to be removed, amounts to many hundreds of dollars in the aggregate.

Other objects will appear in the course of the following description.

Our invention is illustrated in the accompanying drawings, wherein:—

Figure 1 is a longitudinal sectional view of a valve casing and the valve operating mechanism, the view being partly in section;

Fig. 2 is a vertical sectional view on the line 2—2 of Fig. 1 showing the valve closed;

Fig. 3 is a like view to Fig. 2, but showing the valve opened, that is, the valve body partly raised.

Referring to these figures, and particularly to Figs. 1 and 2, 10 designates two sections of a pipe line, between which is disposed the valve casing 11 having flanges at its ends abutting against like flanges on the pipe line sections and bolted thereto. The valve casing 11 is formed with a bonnet 12 extending upward and at an inclination to the axis of the valve casing and formed at its upper end with flanges 13. The valve casing is formed with a valve seat 14, the sides of the valve casing being formed with guide flanges 15, and operating against this seat and having a width equal to the interior width of the bonnet 12 is a valve body 16 having a central opening 17. The valve body is, of course, disposed at an inclination to the axis of the valve casing and slides vertically against the seat 14 and into or out of the bonnet 12. The lower portion of the body 16 is reduced in thickness and swingingly mounted upon the valve body is a clapper valve or check valve designated 18. This check valve is shown as concavo-convex in form and is provided with ears 19 entering recesses in the valve body and pivoted to the valve body by means of a transverse pivot pin 20. We do not wish, however, to be limited to this construction. It will be obvious, of course, that the check valve 18 will swing outward, that is, toward the left in Fig. 1, upon pressure against the concave face of the valve and that it will swing against its seat 21 upon pressure in the opposite direction. The valve casing 11 is enlarged at 22 to permit the valve 18 to swing fully upward.

For the purpose of shifting the valve body into or out of the bonnet or into or out of its operative position, we swivel to the valve body the screw shaft 23 which at its lower end is provided with a head 24 seating within a recess 25 in the upper face of the valve body and held in place by an annulus 26 also formed on its under face with a recess to receive said head, this annulus 26 being connected to the valve body by screws or bolts or in any other suitable manner. Thus the shaft 23 is swiveled to the valve body.

The shaft 23 is longer than the bonnet 12 and passes through a head 27 bolted to the flanges 13 of the bonnet, this head being provided at its center with a stuffing box 28 through which the shaft 23 passes. The upper end of the shaft 23 is screw-threaded as at 29 and passes through a yoke 30, this yoke being bolted to the flanges 13. The shaft 29 passes through an opening in the yoke at its upper end and engaging the upper screw-threaded end of the shaft is a nut having the form of a wheel 31 whose hub is interiorly screw-theaded. It will be obvious now that a rotation of the wheel in one direction will cause the elevation of the valve body but if the wheel be rotated in the opposite direction, the weight of the valve body will cause the valve body to move downward into its operative position. Of course, means may be provided for positively shifting this valve body both downward and upward and we do not wish to be limited to any particular means for raising or lowering the valve body.

The operation of this valve will be obvious from what has gone before. Under normal circumstances, the valve body 16 is in the position shown in Figs. 1 and 2 so that the central opening of the valve body forms the continuation of the inlet bore of the valve casing. Under these circumstances, the check valve 18 acts in the ordinary manner to permit flow of fluid in one direction but prevent a return of the fluid. Now if it be desired to permit a return of the fluid, the wheel 31 is turned in the proper direction to lift the shaft 23 and this lifts the valve body to a greater or less extent as may be desired, permitting a return of the fluid. The moment that the valve body 16 is raised, even a little, pressure on the valve is relieved and the valve body travels easily up into the bonnet, leaving a clear line for the return of the fluid. One man is able to operate this valve, that is, to raise or lower it, thus saving the expense incident to the removal of the ordinary check valve. By shifting the valve, it permits the pumping back of oil which has passed the check valve.

It will be noted that by cutting away the forward face of the body, the check valve 18 is supported so that its outer face does not project beyond the outer face of the valve body, thus permitting the valve body and check valve to move upward into the bonnet.

While we have designed this valve with special reference to its use in high pressure oil pumping systems, yet it is obvious that it might be used in a variety of different places and under many different circumstances, with great advantage. While we have illustrated a construction which is thoroughly effective for the purpose for which it is designed, yet it is obvious that many changes may be made in the details of construction, without departing from the spirit of the invention as defined in the appended claims.

Having thus described our invention, what we claim is:

1. A valve casing having a longitudinally extending bore, and a bonnet rectangular in cross section extending from the casing, a valve body having a sliding fit in the bonnet and movable into or out of said bonnet and into or out of a position across the bore of the valve casing and having an opening alining with the bore, a check valve mounted upon the body, and means extending through said bonnet for manually shifting the body into or out of operative position, said means including a screw-threaded shaft operatively engaging the bonnet and the valve body.

2. A valve casing having a longitudinally extending bore, and a bonnet rectangular in cross section extending from the casing, a valve body having a sliding fit in the bonnet and movable into or out of said bonnet and into or out of a position across the bore of the valve casing and having an opening alining with the bore, a check valve mounted upon the body, and means extending through said bonnet for manually shifting the body into or out of operative position, said means including a shaft extending through the bonnet and having swiveled engagement with the valve body and screw-threaded at its upper end, and a nut having screw-threaded engagement with the shaft.

3. A valve casing having a longitudinally extending bore and an inclined seat, the casing being formed with a bonnet just forward of the seat, a valve body having a sliding fit in the bonnet and shiftable into or out of the bonnet and bearing against the seat and having an axial opening registrable with the bore of the valve casing, a check valve swingingly mounted upon the body, the body being cut away upon one face to accommodate the check valve, the check valve being normally supported inward of the faces of said body whereby the body and check valve may move upward into the bonnet, and manually operable means coacting with the bonnet and operatively connected to the body for shifting the body into or out of operative position within the valve casing.

In testimony whereof we hereunto affix our signatures.

JOHN H. SUMMERS.
EDWARD S. KIRK.